(12) United States Patent
Schmidt

(10) Patent No.: US 8,395,281 B2
(45) Date of Patent: Mar. 12, 2013

(54) DEVICE

(75) Inventor: Josef Schmidt, Graben-Neudorf (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 1049 days.

(21) Appl. No.: 12/084,314

(22) PCT Filed: Oct. 13, 2006

(86) PCT No.: PCT/EP2006/009900
§ 371 (c)(1),
(2), (4) Date: Apr. 28, 2008

(87) PCT Pub. No.: WO2007/048511
PCT Pub. Date: May 3, 2007

(65) Prior Publication Data
US 2009/0257200 A1    Oct. 15, 2009

(30) Foreign Application Priority Data

Oct. 28, 2005   (DE) .......................... 10 2005 052 135

(51) Int. Cl.
*H01F 27/42* (2006.01)
(52) U.S. Cl. ........................................................ 307/104
(58) Field of Classification Search .................... 307/104
See application file for complete search history.

(56) References Cited

U.S. PATENT DOCUMENTS

| | | | | |
|---|---|---|---|---|
| 5,014,793 A * | 5/1991 | Germanton et al. | .......... | 173/181 |
| 5,293,308 A * | 3/1994 | Boys et al. | .................... | 363/37 |
| 5,434,493 A * | 7/1995 | Woody et al. | ................ | 320/108 |
| 5,638,262 A * | 6/1997 | Brown | ........................... | 363/19 |
| 5,654,621 A * | 8/1997 | Seelig | ........................... | 320/108 |
| 5,917,307 A * | 6/1999 | Watanabe et al. | ............. | 320/108 |
| 5,923,544 A * | 7/1999 | Urano | .............................. | 363/22 |
| 6,053,405 A * | 4/2000 | Irwin et al. | ..................... | 235/375 |
| 6,076,573 A * | 6/2000 | Welsh et al. | ............... | 144/117.1 |
| 6,087,800 A | 7/2000 | Becker et al. | | |
| 6,476,520 B1 | 11/2002 | Boehm et al. | | |
| 7,154,801 B1* | 12/2006 | Chu et al. | ....................... | 365/226 |
| 2003/0087601 A1* | 5/2003 | Agam et al. | .................... | 455/39 |
| 2003/0101526 A1* | 6/2003 | Hilscher et al. | ................ | 15/22.1 |
| 2004/0099746 A1* | 5/2004 | Norton | .......................... | 235/492 |
| 2004/0150934 A1* | 8/2004 | Baarman | ...................... | 361/115 |
| 2004/0164721 A1* | 8/2004 | Kwatra et al. | ................ | 323/286 |
| 2005/0109841 A1* | 5/2005 | Ryan et al. | .................... | 235/380 |
| 2005/0134213 A1* | 6/2005 | Takagi et al. | ................. | 320/108 |
| 2007/0002661 A1* | 1/2007 | Chu et al. | ....................... | 365/226 |

FOREIGN PATENT DOCUMENTS

| | | |
|---|---|---|
| DE | 197 19 730 | 10/1998 |
| DE | 199 57 064 | 6/2001 |
| DE | 102 58 075 | 6/2004 |
| EP | 1 452 739 | 9/2004 |
| GB | 2 370 462 | 6/2002 |
| WO | WO 03/096139 | 11/2003 |

OTHER PUBLICATIONS

International Search Report, PCT International Patent Application No. PCT/EP2006/009900, dated Jun. 1, 2007.

(Continued)

*Primary Examiner* — Daniel Cavallari
(74) *Attorney, Agent, or Firm* — Kenyon & Kenyon LLP

(57) ABSTRACT

A device, a module being insertible into a housing-forming recess of the device, energy and/or data being transmittable in a contactless manner.

25 Claims, 2 Drawing Sheets

OTHER PUBLICATIONS

Translation of International Preliminary Report on Patentability, PCT International Patent Application No. PCT/EP2006/009900, dated Jun. 19, 2008.

European Office Action, dated May 6, 2011, issued in corresponding European Patent Application No. 06828813.3.

* cited by examiner

DEVICE

FIELD OF THE INVENTION

The present invention relates to a device.

BACKGROUND INFORMATION

Converters or drives are known as devices, for example.

SUMMARY

Example embodiments of the present invention are based on handling the high variance of applications, in which devices may be used, by as few components as possible.

Among features of example embodiments of the present invention in the device are that a module is insertible into a housing-forming recess of the device, energy and/or data being transmittable in a contactless manner. The device with its recess is thus designed to conform to a high protection class and is nevertheless able to transmit energy and data to the module. The module is capable of sending data back. Thus the module is able to parameterize the device even in applications in a demanding environment.

The device may be arranged as a converter, a soft-start device or a drive. An advantage in this regard is that parameters must be input in such devices and thus an operating device must be connected. Metallic contacts are provided for this purpose in certain conventional arrangements. In example embodiments of the present invention, however, contactless operating options may be implemented. Thus, example embodiments of the present invention may also be used in a harsh industrial environment, for example, where there are liquids splashing around, etc. Such devices may even be designed to include extended hardware such that a positioning or sequence control such as SPS is integrated into the device. Here too, the software must be operated and thus an operator interface is required, which is now connectible in a contactless manner. In addition, there is no wear in a plug connector contact in example embodiments of the present invention, and other wear does not occur either.

The drive may include at least one electric motor and a power-supplying electronic circuit such as a converter, a soft-start electronics, etc. In particular, the drive includes a gear unit that may be driven by the electric motor. An advantage in this regard is that the drive may be designed as a compact drive.

The module may include an input device and/or a display device and/or a plug connector interface. An advantage in this regard is that optionally arbitrarily designed modules may be used. Thus, it is possible to use the module appropriate for any function or application.

The device may have a mechanical, in particular a force-locking or form-locking, and electromagnetically contactless, in particular inductive, interface of such a kind that modules having a corresponding mechanical and electromagnetically contactless, in particular inductive, interface may be optionally connected. An advantage in this regard is that the module is held mechanically, for example by being clipped in, and the electrical interface is replaced by an inductive or even optical interface. Infrared interfaces may thus be implemented as well.

The recess may have a plastic surface toward the external environment. An advantage in this regard is that an insulation stability is provided between the energized parts of the device and of the module. This galvanic isolation has safety-related advantages, that is, it increases the safety of the device.

A module may have a 24 Volt supply source for additional devices electrically connectible to the module, the energy for the 24 Volt supply source being transmitted inductively from a coil in the interior of the device to the module. An advantage in this regard is that in spite of the contactless supply the module may provide a supply for a data bus such as a field bus or other devices.

The device may be connected to mains supply lines upon which data are also modulated at higher frequency for the data exchange between the device and additional devices. An advantage in this regard is that no lines are required for data transmission, but rather already existing lines may be used.

The device may be supplied in a contactless manner, in particular inductively from a primary conductor, into which a medium-frequency current, in particular having a frequency between 20 and 100 kHz is fed, data for the data exchange between the device and additional devices also being modulated upon the primary conductor at a higher frequency than the medium frequency of the current in the primary conductor. An advantage in this regard is that in such a system data are transmittable together with the energy in a galvanically decoupled and contactless manner. A particular advantage is also the fact that a mechanical removal of the primary conductor from the corresponding secondary part of the device suffices for disconnecting the device. The primary conductor current may continue to flow undisturbed and does not need to be switched off.

The drive may include a first housing region, including the electric motor and, if applicable, the gear unit, and a third housing region, which is connected to the first only via a second. An advantage in this regard is that the second housing region may be designed as having connection terminals and transfer plug connections toward the third region as well as electrical connection terminals toward the outside. Thus an electrical interface is created between the third housing region, which includes sensitive and maintenance-intensive electronics, and the second housing region, which includes preferably robust connection technology without semiconductors.

The second housing region may include connection terminals for the supply lines of the electric motor and a plug connector unit for the electrical plug connection to the third housing part. An advantage in this regard is that the third housing part may be connected and exchanged in a simple and quick manner, while the second part includes the work-intensive wiring, etc.

The housing parts may be connected in an impervious manner and in conformity with a high protection class. An advantage in this regard is that the device may also be used in a harsh environment.

LIST OF REFERENCE CHARACTERS 1 housing part
2 housing part
3 shaft
4 recess
5 input device and/or display device
6 modules
7 electrical plug connector parts
20 housing part
21 housing part Example embodiments of the present invention will be explained in greater detail with the aid of figures.

DETAILED DESCRIPTION

Figure 1:
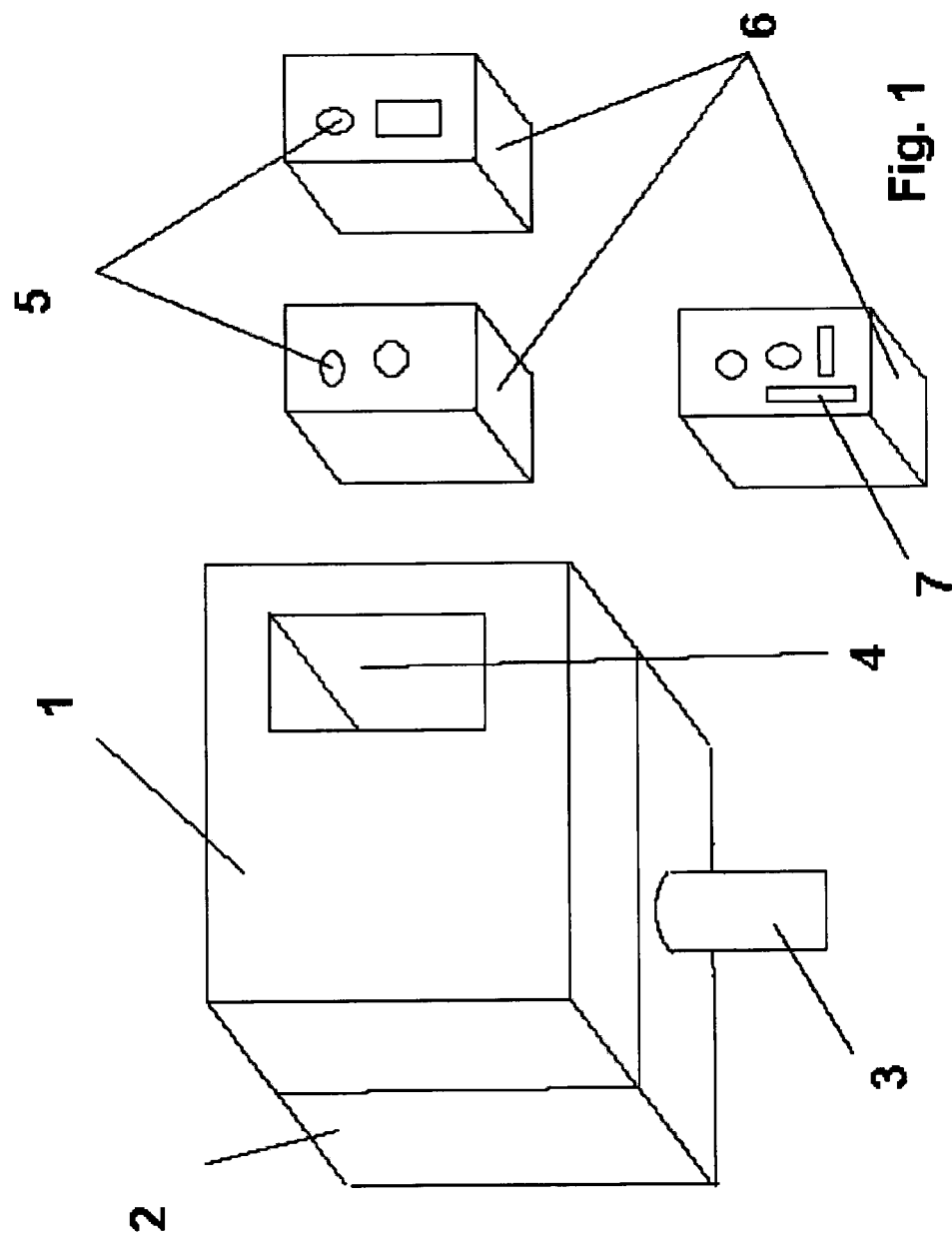
FIG. 1 illustrates an example embodiment of the present invention.

A device according to an example embodiment of the present invention is schematically illustrated in FIG. 1.

The drive has a housing that is composed of housing parts 1, 2. Housing part 2 surrounds the electromechanical regions, that is, the electric motor and the gear unit, the output shaft 3 of which protrudes from the housing. Housing part 2 surrounds the electronic region such as trigger electronics or converter electronics as well as control electronics, etc.

It is important that a housing part 1 has a recess 4, which is designed to conform to a high protection class and has no electrical contacts toward the surroundings. For this purpose it is important that the recess represents a housing-forming surface of the drive and is thus designed to be impervious. The recess is preferably designed as a housing pocket.

A module 6 is insertible into recess 4, which includes, depending on the particular arrangement, input device(s) and/or display device(s) 5 and/or electrical plug connector parts 7.

That is, module 6 may be designed as a module having a potentiometer, rotary knobs, push-buttons and/or switches. Parameters of the drive may be influenced by these input device(s).

Alternatively, a module 6 having other input device(s) may be used.

Furthermore, a module may be used alternatively, which includes display device(s) such as illuminating device(s) and/or acoustic device(s) such as loudspeaker, siren, etc.

In addition, modules may also be used that include plug connectors for connecting field bus stations such as additional drives or converters or industrial devices. Computers for the initial operation or parameterization of the drive may also be connected to these or differently designed plug connectors.

It is also important that the module, depending on the particular arrangement, even includes plug connectors for connecting actuators or sensors.

One of the modules includes an infrared interface and/or a radio wave interface such as Bluetooth, etc.

On account of the housing pocket, the drive is designed to be sealed, as it were. The energy supply and the data exchange from the drive to module 6 occurs in a contactless manner through the recess surface.

The surface of recess 4 is preferably made of plastic. In the interior behind the surface, a coil may thus be provided, which is inductively coupled to a coil in the interior of module 6. To be sure, the coupling is weaker than in the case of a transformer.

In the case of a very weak coupling, the coil in the interior of module 6 is therefore operated in resonance with a capacitor connected in series or in parallel and dimensioned such that the resonance frequency essentially equals the frequency of the current fed into the coil located in the interior of the drive. A high efficiency factor is achievable in this manner.

One of the modules 6 may therefore be designed such that it is also able to ensure a 24 Volt supply of additional connected electronic components.

In other exemplary embodiments, instead of the drive, a converter may also be equipped with the described recess 4, thus also attaining the advantages described herein.

It is important that the recess and the mentioned coil in the interior of the drive or converter create a mechanical and also inductive interface, to which different kinds of modules may be connected. Depending on the use, that is, the application of the drive or converter, different modules may then be connected.

A module is even exchangeable depending on the function: For example, during maintenance or initial operation or a parametrization initiated for other reasons, a module having a plug connector or contactless interface is used to establish a data exchange connection to a laptop. Following the completion of the maintenance or initial operation or of the parametrization initiated for other reasons, the module is exchanged for a module that only includes a rotary knob, for example a rotary knob connected to a potentiometer, or other input device having a limited potential for influencing parameters. Alternatively, a module is used that includes only display device(s) or display device(s) in combination with the input device(s) for limited input potential.

The drive or the converter may be supplied only via its mains supply. The data exchange with other devices is effected by modulating the data upon the mains supply lines at higher frequencies.

Figure 2:
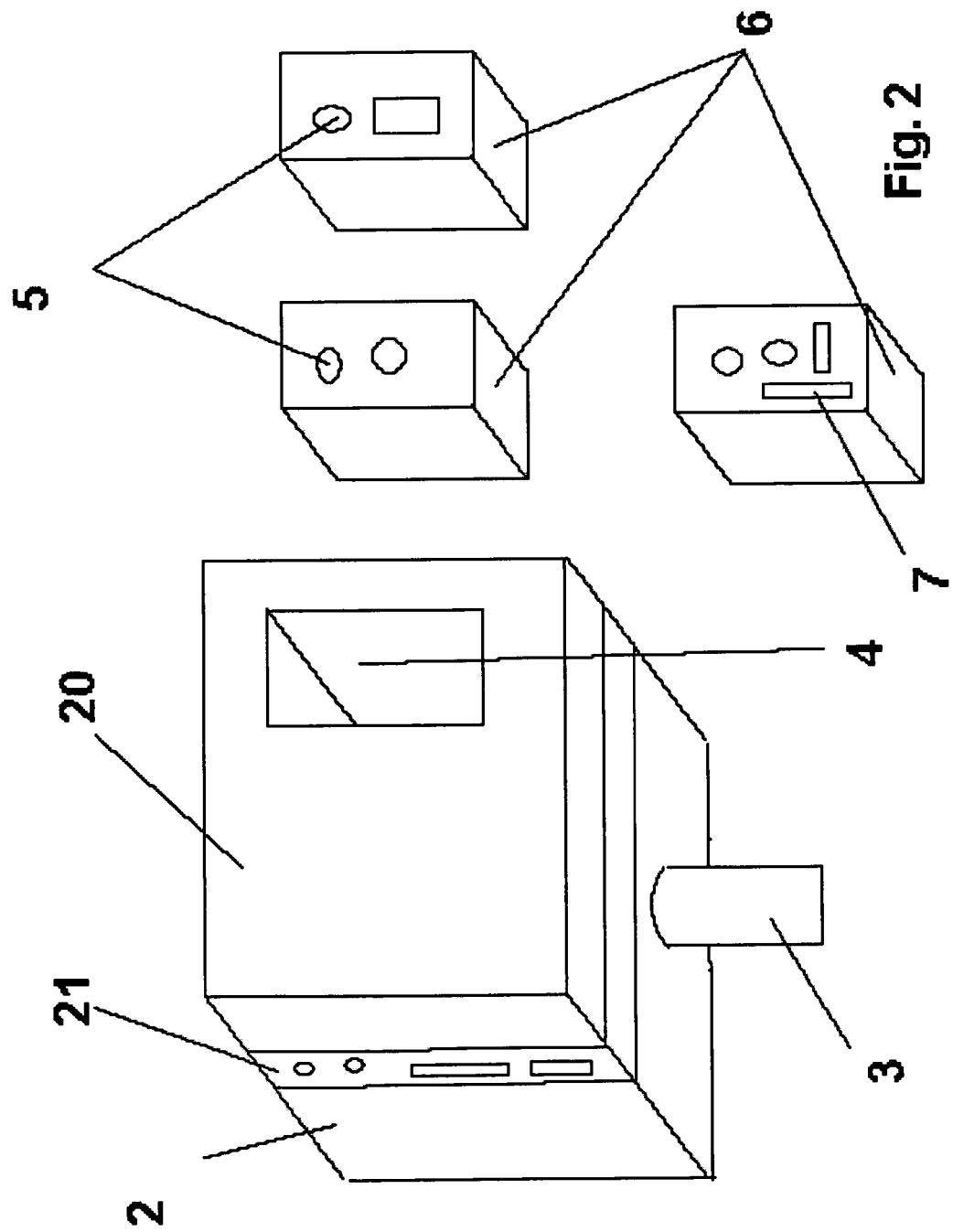
FIG. 2 illustrates an example embodiment of the present invention.

FIG. 2 schematically shows an example embodiment in which, however, housing part 20 including recess 4 is connected to housing part 2 including the geared motor only via housing part 21. Thus the bearings of the gear unit and of the motor may use a common housing part, and the manufacturing tolerances may be improved. The cutting work on the bearings is performed in a clamp. In housing part 21, the lines of the electric motor, of a possibly associated brake and/or the lines of a sensor connected to the electric motor or gear unit, such as an angular position sensor, are handed over on connection terminals, including plug connector parts, to housing part 20 capable of being plugged on by a plug connector and connected in an impervious manner and in accordance with a high protection class. This housing part includes the power electronics and the signal electronics. The heat of the power electronics is dissipated to the environment via housing part 20. Thus a great distance is established between the heat sources of the power electronics and the motor and gear unit, and there are fewer mutual influences.

Housing part 21 may also include a heat barrier or may itself be made of material having a poor thermal conductivity such as plastic.

In housing part 20, the printed circuit board having the power semiconductors is thus situated directly on the inner side of housing part 20. The signal electronics is situated at a distance from it, in particular on a printed circuit board situated in parallel. A heat barrier may also be provided between the power electronics and the signal electronics.

What is claimed is:

1. A device, comprising:
   a housing having a housing-forming recess on an outer surface of the housing, the housing enclosing a drive including at least one electric motor and a power-supplying electronic circuit; and
   a module insertible into the housing-forming recess of the housing of the device, the module configured to contactlessly transmit energy and data to the device.

2. The device according to claim 1, wherein power-supplying electronic circuit includes at least one of (a) a converter and (b) a soft-start electronics.

3. The device according to claim 1, wherein the drive includes a gear unit, the electric motor configured to drive the gear unit.

4. The device according to claim 1, wherein the module includes at least one of (a) an input device, (b) a display device, and (c) a plug connector interface.

5. The device according to claim 1, further comprising a mechanical and electromagnetically contactless interface adapted to connect to a corresponding mechanical and electromagnetically contactless interface of the module.

6. The device according to claim 5, wherein the mechanical and electromagnetically contactless interface is form-locking and inductive.

7. The device according to claim 1, wherein the recess includes a plastic surface toward an exterior environment.

8. The device according to claim 1, wherein the module includes a 24-volt supply source adapted to electrically connect to additional devices, energy for the 24-volt supply source transmittable inductively from a coil in an interior of the device to the module.

9. The device according to claim 1, wherein the device is connectable to mains supply lines, upon which data are also modulated at higher frequency for exchange of data between the device and additional devices.

10. The device according to claim 1, wherein the device is suppliable at least one of (a) in a contactless manner and (b) inductively from a primary conductor into which at least one of (a) a medium-frequency current and (b) a current at a frequency between 20 and 100 kHz is feedable, data for data exchange between the device and additional devices modulatable upon the primary conductor at a higher frequency than the frequency of the current in the primary conductor.

11. The device according to claim 1, wherein the drive includes a first housing region, including an electric motor, and a third housing region connected to the first housing region only via a second housing region.

12. The device according to claim 11, wherein the first housing region includes a gear unit.

13. The device according to claim 11, wherein the second housing region includes connection terminals configured to connect to supply lines of the electric motor and a plug connector unit for an electrical plug connection to the third housing part.

14. The device according to claim 11, wherein the housing parts are respectively connected in an impervious manner and conforming to a high protection class.

15. The device according to claim 1, wherein the module includes at least one of (a) an input device, (b) a display device, and (c) a plug connector interface.

16. The device according to claim 1, further comprising a mechanical and electromagnetically contactless interface adapted to connect to a corresponding mechanical and electromagnetically contactless interface of the module.

17. The device according to claim 16, wherein the mechanical and electromagnetically contactless interface is form-locking and inductively coupled.

18. The device according to claim 1, wherein the recess includes a plastic surface toward an exterior environment.

19. The device according to claim 1, wherein the module includes a 24-volt supply source adapted to electrically connect to additional devices, energy for the 24-volt supply source transmittable inductively from a coil in an interior of the device to the module.

20. The device according to claim 1, wherein the device is connectable to mains supply lines, upon which data are also modulated at higher frequency for exchange of data between the device and additional devices.

21. The device according to claim 1, wherein the device is suppliable at least one of (a) in a contactless manner and (b) inductively from a primary conductor into which at least one of (a) a medium-frequency current and (b) a current at a frequency between 20 and 100 kHz is feedable, data for data exchange between the device and additional devices modulatable upon the primary conductor at a higher frequency than the frequency of the current in the primary conductor.

22. The device according to claim 1, wherein the drive includes a first housing region, including an electric motor, and a third housing region connected to the first housing region only via a second housing region.

23. The device according to claim 22, wherein the first housing region includes a gear unit.

24. The device according to claim 22, wherein the second housing region includes connection terminals configured to connect to supply lines of the electric motor and a plug connector unit for an electrical plug connection to the third housing part.

25. The device according to claim 22, wherein the housing parts are respectively connected in an impervious manner and conforming to a high protection class.

* * * * *